T. SABBATON.
Apparatus for the Manufacture of Illuminating Gas.
No. 52,751. Patented Feb. 20, 1866.
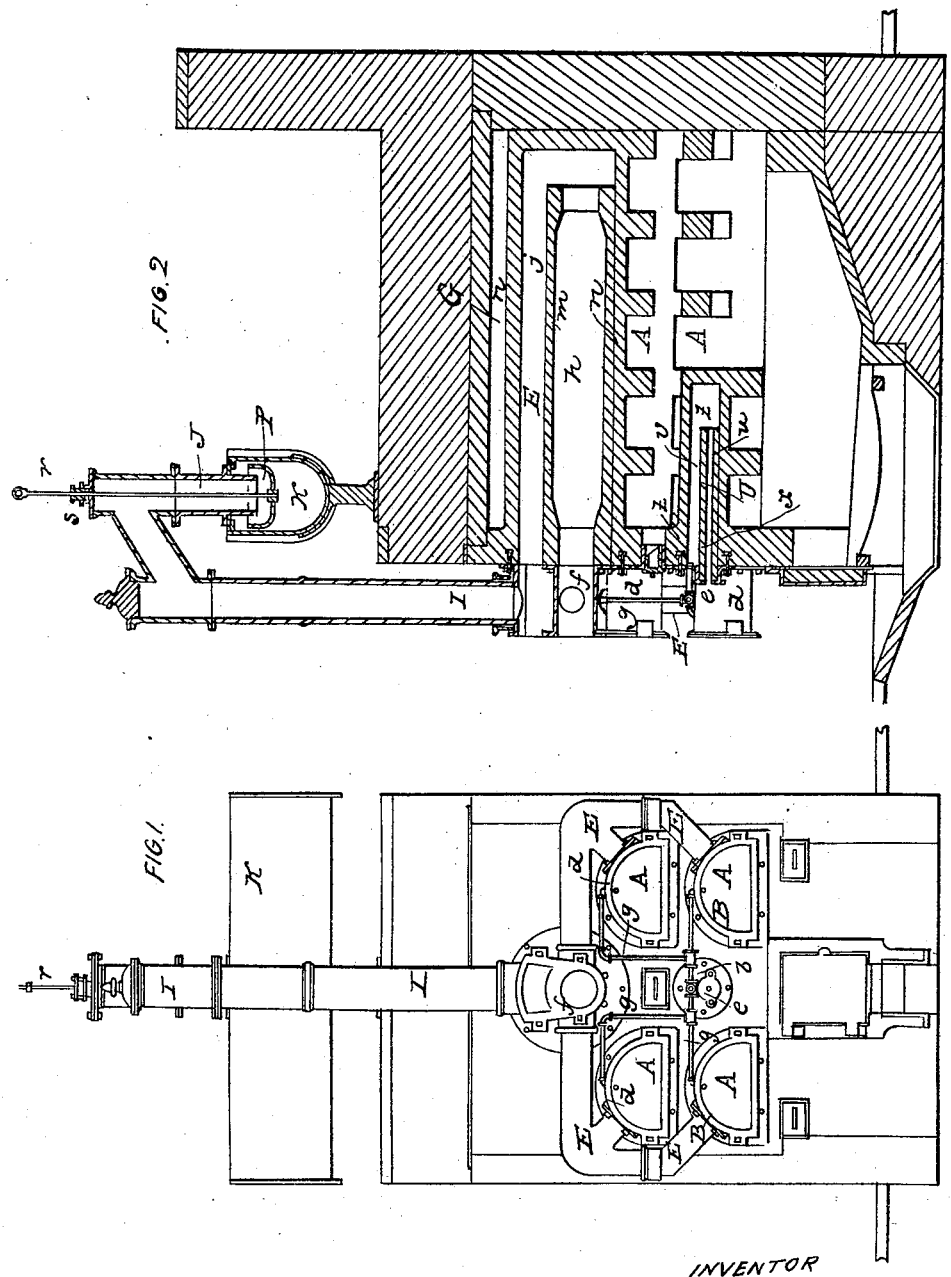

UNITED STATES PATENT OFFICE.

TYLER SABBATON, OF NEW YORK, N. Y.

IMPROVED APPARATUS FOR THE MANUFACTURE OF ILLUMINATING-GAS.

Specification forming part of Letters Patent No. 52,751, dated February 20, 1866.

*To all whom it may concern:*

Be it known that I, TYLER SABBATON, of the city, county, and State of New York, have made certain new and useful Improvements in Apparatus for the Manufacture of Illuminating-Gas; and I do hereby declare that the following is a full, clear, and exact description of the same, reference being had to the accompanying drawings, in which—

Figure 1 represents a front elevation of bench of retorts and their appurtenances embodying my invention, the lids of the retorts being removed; and Fig. 2 represents a vertical longitudinal central section of the same.

The invention which constitutes the subject-matter of the present patent has for its object the simplification of the apparatus employed for the distillation and decomposition of gas-stock; and the first part of it consists of the combination of several distillatory retorts of a bench with one regenerating-retort, in which the products of the several distillatory retorts are mixed and more thoroughly decomposed previous to passing to the hydraulic main of the apparatus.

The second part of the invention consists of the combination of several retorts of a bench with the hydraulic main by means of one delivery or dip pipe filled with a cup-seal in the hydraulic main, so that the one cup-seal prevents the return of gas from the hydraulic main to a series of retorts.

The third part of the invention consists of the combination of a double superheating-retort for steam with several distillatory retorts by pipes in such manner that the steam to be superheated is passed through both chambers of the double superheating-retort before it enters the distillatory retorts.

My several improvements may be used independently, but I prefer to use them all in connection. I also prefer to use four distillatory retorts, A A A A, in a bench, and to arrange them in two tiers, with suitable flues for the circulation of the flame from a furnace, B, placed centrally below the lower tier. These retorts are provided with suitable mouth-pieces d, each of which has an orifice in it for the escape of the products of the distillation, and each of which is fitted with a lid which may be closed and secured in the usual manner. The escape-apertures of the mouth-pieces of the four distillatory retorts A A A A are connected by pipes E E E E with a regenerating-retort, F, located centrally near the upper part of the furnace-arch G; and this regenerating-retort is double, having an inner chamber, h, and an outer chamber, j, the two chambers being formed by the insertion of a smaller firebrick cylinder, m, into the larger cylinder n, forming the exterior of the retort F. The connecting-pipes E E from the distillatory retorts communicate with the mouth-piece f of the inner chamber of the regenerating-retort F, and the mouth-piece of the outer chamber, j, of the said retort is provided with an aperture to which a stand-pipe, I, is fitted; hence the products of the several distillatory retorts A A A A of the bench are caused to pass through the inner chamber, h, of the regenerating-retort to the rear of the outer chamber, j, thereof, and thence to return through the outer chamber to the stand-pipe I, through which they pass to the dip-pipe J, and thence to the hydraulic main K, running along the top of the bench. In this manner the products of several distillatory retorts are mixed and thoroughly decomposed by the use of a single regenerating-retort, and as the latter is double, all the connecting-pipes and the stand-pipe may be arranged at the front of the bench.

In order that the gas passing to the hydraulic main may not escape when the retorts are opened, the dip-pipe J, through which the gas enters the hydraulic main, is fitted with a cup-seal, P, suspended by a rod, r, which passes through a stuffing-box, s, in the cap of the dip-pipe, so that the cup-seal P may be set in any desired position. This combination and arrangement permits a single cup-seal to be used for several retorts.

In order that superheated steam may be supplied to the retorts of the bench, a double superheating-retort, U, is set centrally directly over the furnace. This retort is composed of fire-brick material, and has two chambers, v and w, formed by inserting a smaller cylinder, x, inside the exterior cylindrical retort, z. It is provided with a mouth-piece, b, having two apertures, the one, e, communicating with the inner chamber, w, and the other with the outer chamber, v. The former aperture is connected by a pipe with a steam-boiler, and the latter aperture is connected by branching pipes g g g g with the distillatory retorts of the bench, so that the steam from the boiler is thoroughly superheated by passing through the inner and outer chambers of the superheating-retort, and is then distributed to the distillatory retorts; and all the pipes connecting with the superheating-retorts are situated at the front of the bench, where they are easily accessible.

The inner cylinder, $x$, of the superheating-retort, as well as that ($h$) of the regenerating-retort, may, of course, be metal pipes, if deemed expendient. The exterior of the retorts may also be of metal; but I prefer to form them all of fire-brick material on account of the greater durability.

Having thus described an apparatus embodying all my combinations, I declare that I do not claim to be the first who combined one distillatory retort with one regenerating-retort, as I am aware that such a combination is described in the English patent of John Malam for the year 1835; nor do I claim to be the inventor of the cup-seal for a dip-pipe, nor the invention of introducing superheated steam into a distillatory or regenerating retort, my invention being limited to the new combinations which I have produced.

What I claim, therefore, as my invention, and desire to secure by Letters Patent, is—

1. The combination, in a gas apparatus, of several distillatory retorts with one regenerating retort, substantially as set forth.

2. The combination of several retorts of a bench with the hydraulic main by means of one dip-pipe fitted with a cup-seal, substantially as set forth.

3. The combination of the retorts of a bench with a double-chambered superheating-retort by pipes, in such manner that the steam to be superheated passes through both chambers of the superheating-retort before it passes to a distillatory or decomposing retort, substantially as set forth.

In testimony whereof I have hereunto set my hand this 30th day of August, A. D. 1865.

TYLER SABBATON.

Witnesses:
E. S. RENWICK,
W. L. BENNEM.